UNITED STATES PATENT OFFICE.

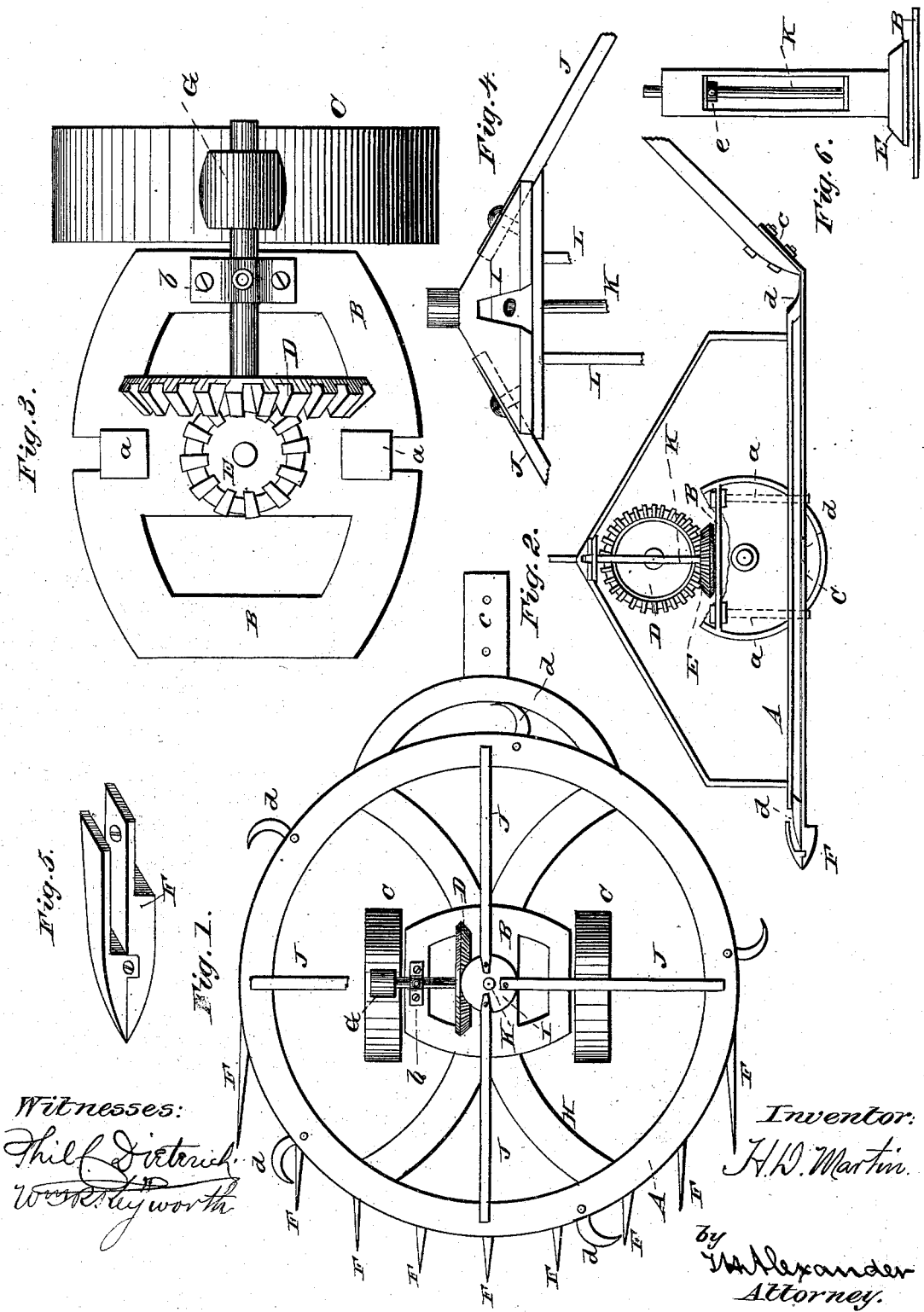

HENRY D. MARTIN, OF YPSILANTI, MICHIGAN.

LAWN AND FIELD MOWER.

SPECIFICATION forming part of Letters Patent No. 270,090, dated January 2, 1883.

Application filed July 20, 1882. (No model.)

*To all whom it may concern:*

Be it known that I, HENRY D. MARTIN, a citizen of the United States, residing at the city of Ypsilanti, in the county of Washtenaw and State of Michigan, have invented certain new and useful Improvements in Lawn and Field Mowers, of which the following is a specification.

My invention relates to improvements in lawn and field mowers, in which the standing grass is severed by horizontally-moving knives, while the grass is held in a vertical position by horizontal parallel guard-teeth; and the objects of my improvements are, first, to produce a mower which will cut high and short grass with equal facility, and, second, by giving the cutting-knives a continuous motion, to lessen the draft necessary to propel the mower. I attain these objects by the mechanism illustrated in the accompanying drawings, in which—

Figure 1 is a top view of the mower. Fig. 2 is a vertical section of the same. Fig. 3 is a plan of the table and gearing. Fig. 4 is an elevation of flange-carrying arms of wheel A. Fig. 5 is an isometrical projection of guard-tooth. Fig. 6 is an elevation of the post K and spindle L.

Similar letters refer to similar parts throughout the several views.

H is the bed-plate of the mower, carrying the guard-teeth F and wheels C, to which the handle of the mower is attached.

B is the table carrying the post K, and resting upon the axle of the carriage-wheels C C, and to which table the gearing is attached, being the bevel-gear D E and small wheel or friction-roller G. The bed-plate is circular in form and of the exact size of the knife-wheel A. Upon the post K the beveled wheel E revolves, carrying with it by means of a small spring-ratchet the spindle L, the ratchet allowing the spindle and wheel A to continue to revolve even though the carriage is at rest.

I is a flange of the head of the spindle L, to which the arms J J J J of the wheel A are attached. The axis of the wheel A (the spindle L) projects above the bevel-gear D E, as shown in Fig. 2, and the arms J J J J (to the lower ends of which the wheel A is attached) extending beyond the gearing and carriage-wheels, there is nothing to obstruct the revolution of the wheel A.

Upon the post K, immediately below the head of the spindle L, is a steel collar, *e*, which may be moved up or down upon the post K, and secured by means of a set-screw in the collar, as shown in Fig. 6. Within the head of the spindle L is an annular rib bearing and rotating upon the collar *e*, leaving a space within the head of the spindle above the rib to be filled with oil, and thus furnish constant lubrication to the bearing formed by the collar and rib.

The bed-plate H is attached to the table B by screws *a a*, as shown in Figs. 2 and 3, and by which screws the bed-plate may be raised and lowered. The height of the knife-wheel A is regulated by sliding the spindle L up or down upon the post K, and securing it at the required height by means of the collar *e*.

What I claim as my invention, and desire to secure by Letters Patent, is—

The combination, in a lawn and field mower, of a rotating knife-wheel, A, guard-teeth, spindle L, collar *e*, the bed-plate, and adjusting-screws passed through the table, all constructed and adapted to operate substantially as described.

HENRY D. MARTIN.

Witnesses:
J. WILLARD BABBITT,
WILLARD B. HOFF.